US005447124A

United States Patent [19]
Pollock et al.

[11] Patent Number: 5,447,124
[45] Date of Patent: Sep. 5, 1995

[54] COAT FOR USE WITH BIOLOGICAL WOOL HARVESTING

[75] Inventors: Douglas M. Pollock, Tahmoor; Michael J. Luvio, Bondi Junction, both of Australia

[73] Assignee: Mallinckrodt Veterinary Limited, Australia

[21] Appl. No.: 122,480

[22] Filed: Oct. 29, 1993

[51] Int. Cl.[6] .......... A01K 14/00
[52] U.S. Cl. .......... 119/850
[58] Field of Search .......... 54/79.1, 79.2, 79.4, 54/80.4; 119/850

[56] References Cited

U.S. PATENT DOCUMENTS

| | | | |
|---|---|---|---|
| 312,323 | 2/1885 | Broadhead | 54/79.4 |
| 387,150 | 7/1888 | Crooker | 54/79.4 X |
| 1,553,632 | 9/1925 | Rieck . | |
| 1,612,945 | 1/1927 | Rieck . | |
| 2,103,109 | 12/1937 | De Mar . | |
| 2,222,705 | 11/1940 | Conlon | 119/850 X |
| 2,688,311 | 9/1954 | Pierce | 54/79.4 X |
| 4,489,676 | 12/1984 | Colquist | 54/79.1 X |

FOREIGN PATENT DOCUMENTS

| | | |
|---|---|---|
| 41510/72 | 10/1972 | Australia . |
| 60853/73 | 9/1973 | Australia . |
| 492923 | 3/1976 | Australia . |
| 59755/80 | 10/1981 | Australia . |
| 73659/81 | 2/1982 | Australia . |
| 19576/92 | 3/1991 | Australia . |
| 1517378 | 7/1978 | United Kingdom . |
| 2066636 | 7/1981 | United Kingdom . |

*Primary Examiner*—Gene Mancene
*Assistant Examiner*—Thomas Price
*Attorney, Agent, or Firm*—Peter F. Corless

[57] ABSTRACT

A fleece retention coat (1) for harvesting a fleece of an animal which has been shed by the animal after administering a biological agent to the animal, the coat comprising: a coat body (3) capable of enclosing a substantial portion of the fleece of the animal, and fleece retention means provided on an inner surface of the coat body, the fleece retention means comprising strips of anchoring projections (60) arranged spaced apart to line the interior of the coat. In use, the fleece anchoring projections (60) hold the fleece in situ such that the fleece may be removed from the animal in substantially one piece when the coat is removed from the animal and the fleece is then removable from the coat so that the coat may be resused.

18 Claims, 2 Drawing Sheets

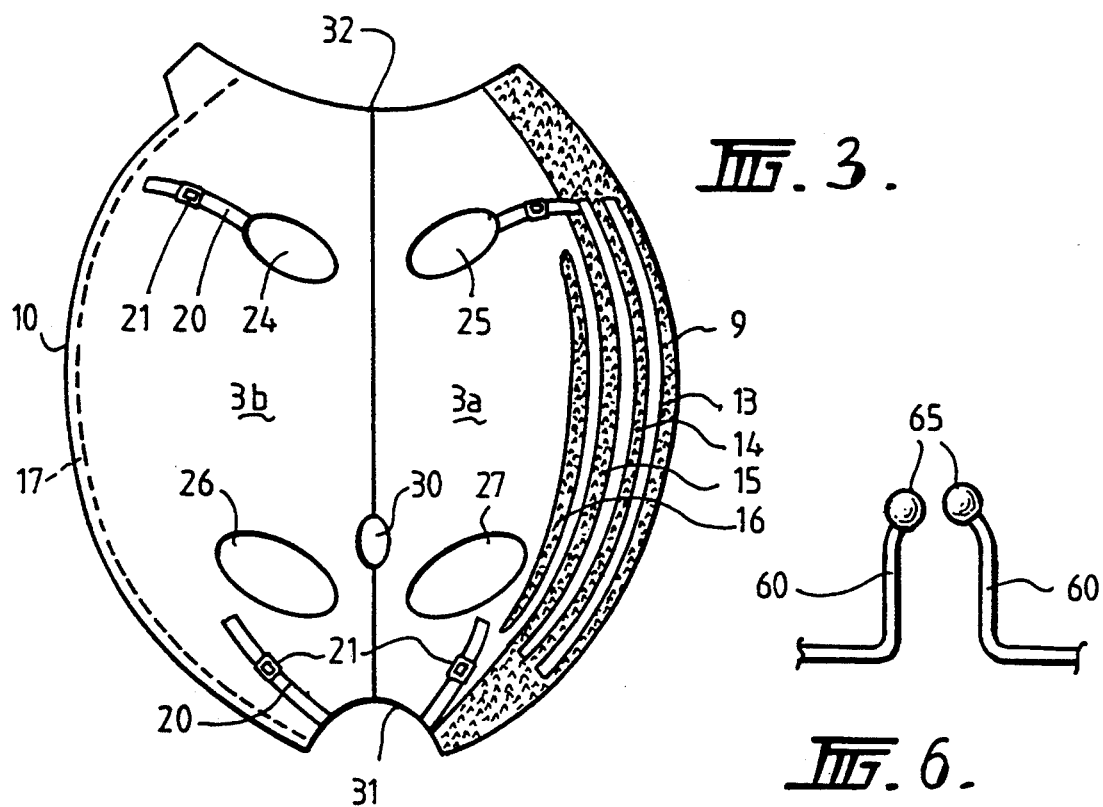
FIG. 3.
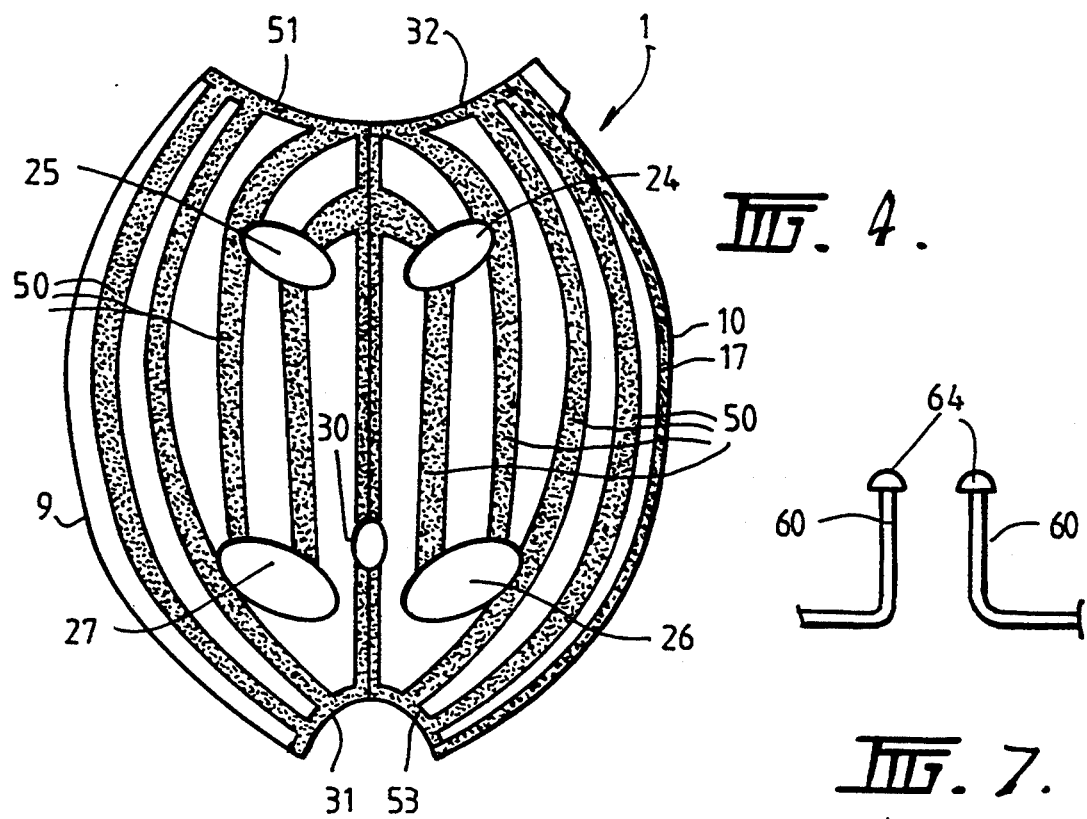
FIG. 4.
FIG. 6.
FIG. 7.

COAT FOR USE WITH BIOLOGICAL WOOL HARVESTING

FIELD OF INVENTION

The present invention relates to a coat which assists in the harvesting of a fleece of an animal which has been shed after biological wool harvesting. More particularly, the present invention relates to a fleece retaining coat used in the biological wool harvesting of sheep.

DISCUSSION OF PRIOR ART

Historically wool has been removed from sheep and other long haired animals by manual shearing using a cutter which is run over the body of the animal. This method is very labour intensive, time consuming and can be stressful for the animal.

It is also known to biologically "shear" a sheep by administering a biological depilatory agent, such as epidermal growth factor, which causes a weakening or complete break in the wool staple at or near skin level. Other depilatory agents are disclosed in for example, CSIRO Australia Patent Applications 11737/76, 59755/80 and 73659/81.

Although biological wool harvesting overcomes a number of the disadvantages of mechanical shearing, it raises problems of its own. The biological depilatory agents cause the wool to fall from the skin over a period of time, which may extend for several days. Sometimes the depilatory agent does not cause a complete break in the wool staple, but merely results in a mechanical weakening. The result of this is that the wool fleece is removed in patches and over a period of time, and it is thus strewn over a wide area if the animals are left to graze. Collecting the wool is difficult and the wool may be damaged when strewn around the grazing area. Confining the animals until all the wool drops off is impractical.

It is therefore a requirement to produce a means for overcoming the above problems. To this end, it is known to produce a cover, jacket or net to be worn by the animal which protects the sheep or assists in retaining the fleece, so that the fleece may be removed in a single operation once all the wool staple has been broken. Such coats and nets have not been successful due to a number of problems.

Australian patent 428078 by Gollin & Co. Ltd discloses a coat which is formed from plastics sheet material, such as woven polyethylene. The coat has an elastic rump portion and non adjustable leg ties. A series of elasticised portions are used to improve the fit of the coat. This coat suffers from the disadvantage that as the wool staple breaks the wool collects under the neck and in the leg portions and belly area of the coat. This may become very uncomfortable for the sheep and can immobilise the sheep, especially if the wool is wet following rain. The additional weight of wet wool can exacerbate the problem of wool movement.

Australian Patent Application 60853/73 by Gollin & Co. Ltd. discloses the use of a net-like coat which consists of an open mesh material adapted to fit closely against the skin of the sheep immediately after shearing. The coat remains against the skin of the sheep, and new wool growth is supposed to extend through the mesh apertures. The principal problem with the mesh coat is that in practice the wool does not grow through the mesh but becomes matted beneath the coat. Furthermore, the animal is required to wear the coat for an extended period of time from a point shortly after shearing until the next shearing (typically 12 months). The coat is prone to damage and detachment over this long period and thus has questionable durability and reduced possibility of reuse. This application also discloses the use of an outer coat which is fitted to the sheep just before shearing. The outer coat prevents the wool from dropping from the sheep at an inappropriate point in time. There is also disclosure of using an adhesive on the inside of the outer coat to assist removal and subsequent handling of the fleece. When harvesting the fleece, both coats are removed with the fleece sandwiched between them after administering a biological depilatory agent. Such a coat is not reusable and is unlikely to be successful in practical applications due to:
 a) the difficulty in removing the wool from the coat,
 b) excessive wool movement within the coat resulting in sagging of the fleece,
 c) possible incapacitation of the sheep, and
 d) wool cotting.

SUMMARY OF THE INVENTION

It is an object of the invention to provide a coat that can be reused in the biological harvesting of sheep.

According to the present invention there is provided a fleece retention coat for harvesting a fleece of an animal which has been shed by the animal after administering a biological agent to the animal, the coat comprising:

a coat body capable of enclosing a substantial portion of the fleece of the animal, and fleece retention means provided on an inner surface of the coat body, wherein, in use, the fleece retention means holds the fleece in situ such that the fleece may be removed from the animal in substantially one piece when the coat is removed from the animal and the fleece is then removable from the coat so that the coat may be reused.

According to the present invention there is further provided a method of harvesting fleece of an animal comprising the steps of:

administering a biological depilatory agent to the animal which causes breakage of the hair of the fleece of the animal, fitting a fleece retention coat according to any one of the preceding claims to the animal so that the coat holds the hair of the fleece of the animal, removing the coat from the animal after a predetermined period of time so that the fleece is removed substantially in one portion from the animal, and removing the fleece from the coat so that the coat may be reused.

DESCRIPTION OF THE DRAWINGS

Preferred embodiments of the present invention will now be described, by way of example only, with reference to the accompanying drawings, in which:

FIGS. 6 and 7 are detailed views of two forms of fleece retention means that form part of the coat.

DESCRIPTION OF PREFERRED EMBODIMENTS

Figure 1:
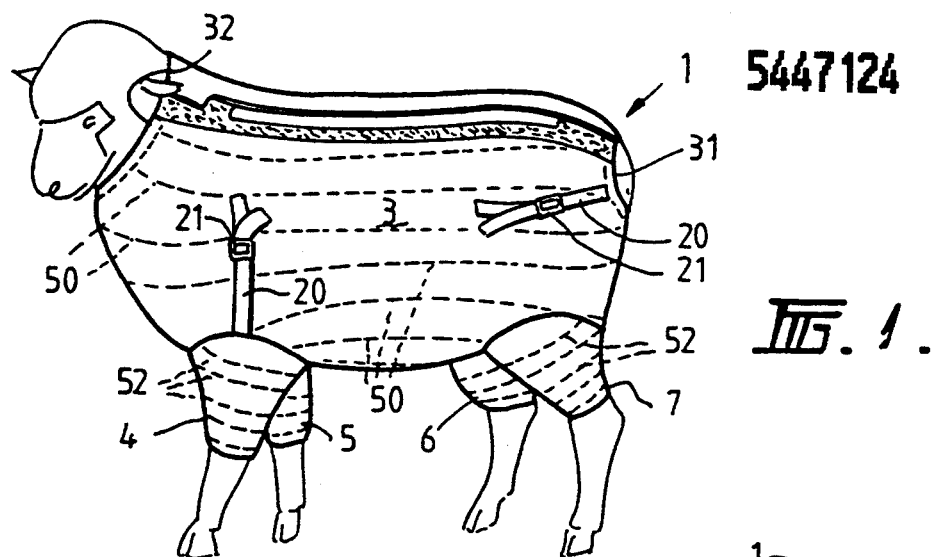
FIG. 1 is a perspective view of a sheep which has been fitted with a coat in accordance with a preferred embodiment of the present invention.
Figure 2:
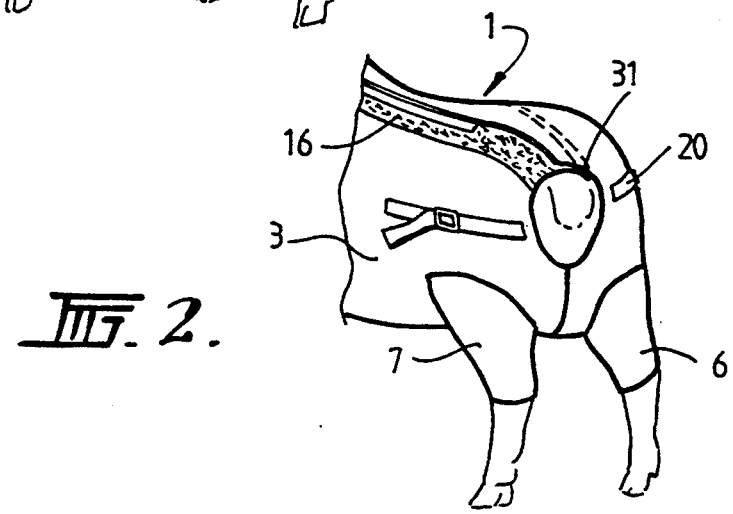
FIG. 2 is a perspective view of the rear of the sheep as shown in FIG. 1, FIGS. 3 and 4 are views of the exterior and interior respectively of the coat when laid open prior to fitting to the sheep.

FIGS. 1 to 7 illustrate details of a coat that can be used in biological harvesting of sheep. The coat 1 is knitted or woven to define a coat body 3 which covers the body of the sheep and four leg portions 4, 5, 6 and 7 which enclose the upper parts of the legs of the sheep. The coat 1 may be formed as a single piece having lateral edges 9 and 10 that can be fastened together along the back of the sheep. In the illustrated form, the coat is produced in two halves 3a, 3b which are stitched together to form a seam 11 extending centrally along the underside and front of the sheep. The halves define the lateral edges 9 and 10 as shown in FIGS. 3 and 4. The knitted or woven mesh of the coat provides a degree of elasticity to accommodate for sheep of different sizes. The coat also includes other features that facilitate adjustability for sheep of different sizes.

As shown in FIG. 3, the outside lateral edge 9 of the coat 1 is provided with a plurality of spaced apart strips 13, 14, 15, 16 of loop fasteners whilst the inside of the outer lateral edge 10 has a hooked or male component 17 of the fastener. In this manner, the degree of overlap of the lateral edges 9 and 10 of the coat 1 can vary by selecting different loop strips 13 to 16. Further adjustment means comprise tensioning straps and buckles 20, 21 positioned adjacent the front legs 4 and 5 and rear quarters of the sheep as shown in FIGS. 1 and 3. The straps and buckles can be tensioned by a simple pull on the strap to pull the coat taut on the sheep.

As shown in particular detail in FIG. 4 which shows the interior of the coat 1 when stretched in an open form. The leg portions 4, 5, 6 and 7 have been omitted for clarity. The coat 1 is formed with four apertures 24, 25, 26 and 27 for leg access and a pizzle aperture 30. The interior of the coat is lined with spaced apart strips 50 of a fleece retention means. The neck, leg and crutch areas have been stabilised to prevent excessive stretching by use of reinforcing bands 51, 52, 53 of retention means.

Figure 5:
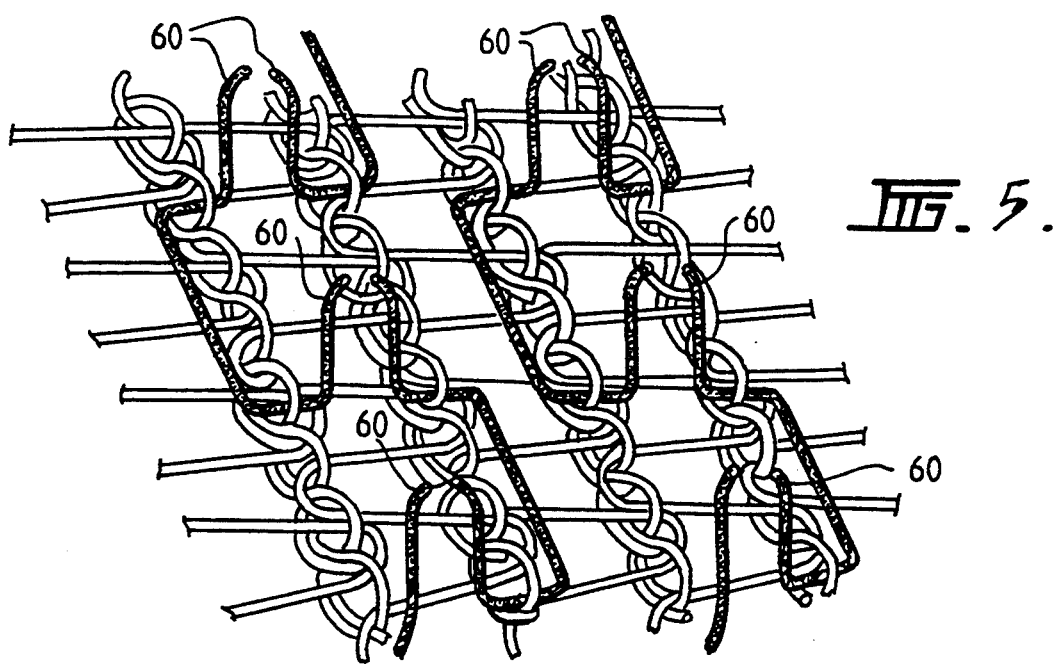
FIG. 5 is a view of one possible form of weave of the coat.

In a preferred embodiment, the retention means comprises a series of strips 50, 51, 52 and 53 of anchoring material in the form of 60 mm wide tapes that are sewn to or otherwise bonded to the interior of the woven coat. The anchoring material has a plurality of hook like anchoring projections 60. The anchoring material is currently produced from a nylon polyamide 66 which has an anchoring projection density of approximately 22 anchor projections per square centimetre. Another material which could be used is a nylon polyester 66 weft and warp material which absorbs less humidity than the nylon polyamide 66. The nylon polyester 66 material has an anchoring projection density of approximately 17 hook elements per square centimetre. The anchoring projections 60 are approximately 3 mm long and are relatively non aggressive when compared to the hook fasteners used in hook and loop fasteners such as VELCRO (registered trade mark). The heads of the anchoring projections can be varied to alter the aggressiveness i.e. the degree of engagement of the anchoring material. In FIG. 5 the projections 60 have internal plain hooks 61 whilst FIG. 6 illustrates an anchoring projection 60 having a ball head 65 which is less aggressive than the mushroom head 64 shown in FIG. 7. The plain hook 61 shown in FIG. 5 appears to be the most appropriate in the wool retaining coat since it engages the fleece sufficiently to prevent the fleece from slipping whilst maintaining a loose enough grip to easily remove the fleece from the coat. For further details of the fleece retention means, reference is made to Australian Patent Application 19576/92.

The strips of anchoring material are attached along the inside of the coat body running the length of the coat as shown in FIGS. 1 and 4. 60 mm wide strips are spaced approximately 70 to 80 mm apart. Ten such strips approximately 1 m in length are attached to the inside of the coat usually by sewing but it is understood that other bonding techniques may be used. A further sophistication illustrated in FIG. 5 comprises weaving the material of the coat to have threads for anchoring projections woven into the fabric. The threads of the anchoring projections are broken at points 61 in order to form the hook-like anchoring projections 60.

It is also understood that the interior of the coat may be lined with anchoring projections of differing constructions at different parts of the coat. Since the fleece of a sheep possesses different qualities in different areas of the sheep it is understood that the fleece retention means can vary accordingly.

The fastening means for securing a coat onto the sheep may generally consist of hook and loop fasteners as described above. However, it is understood that other types of fasteners such as buckles, straps, ties, buttons, press studs, zips and clasps may be utilised to secure the coat onto the sheep.

The coat body is woven or knitted in a material to provide enough elasticity to allow the coat to fit onto a variety of size of sheep and allow the sheep freedom of movement without pain. Although the coat has been designed to accommodate sheeps of various sizes, it is understood that where there are extreme variations between the sizes of the sheep the coats could be produced in different dimensions to accommodate these variations. It is preferred that the material of the coat body is also rigid enough to prevent the coat from sagging and to prevent lateral movement of the coat on the sheep. This is important especially when the wool fleece is wet following a rain and it becomes extremely heavy resulting in the coat stretching out of shape and the wool collecting under the neck and around the legs and belly of the sheep. The coat body is made from material which is an open weave to allow the coat to breathe, but the weave is not so large as to result in the wool escaping or contaminants entering the coat. The coat may be reinforced in places which are subject to high stress which are liable to damage through rubbing against other surfaces. The reinforcement of the coat assists in extending the life of the coat and thus provide the durability necessary to ensure the reusability of the coat.

Details of the preferred coat material are listed hereunder:

| Common Name: | Ski pant material |
| --- | --- |
| Technical Name: | 2/20 ECC × 167DTX |
| Ply: | 2 × 2 (i.e. 2 threads on the weft, 1 thread on the warp) |
| Stretch: | Limited stretch. Approximately 15% |
| Weight per Sq. meter: | Approximately 218 grams |
| Yarn count per Sq. In: | 85 × 42 ends & picks per inch$^2$ |
| Fabric construction: | Warp × weft 300 D × 300 D Width 63 inch |

| | |
|---|---|
| Fabric description: | 100% polyester gabardine diagonal twill weave |
| Colour: | Bleached and scoured |
| Quantity required: | Use 1.8 meters per medium size coat |

The coat 1 is fitted to the sheep after the sheep has been teated with a biological depilatory agent which causes a weaking and breakage of the wool staple near the skin of the sheep. The legs of the sheep are placed through the leg portion 4, 5, 6 and 7 and the cost is then firmly pulled up around the sheep and fastened using the fastening means on the back line of the sheep. The adjusting straps 20 and buckles 21 are adjusted to provide a snug fit of the coat around the tail area and provide adequate support at the front leg and shoulder regions. The coat is fitted to leave the head free and allow the normal biological functions of urination and defecation. The fleece of the sheep is thus enclosed within the coat and is engaged by the interaction of the retention means and the fleece. When the wool staple of the fleece breaks from the skin, the fleece is retained within the coat by the retention means so that on removal of the coat the wool fleece may be harvested in a single operation. As the wool staple is weakened and eventually breaks from the skin, the wool becomes detached from the skin of the sheep but is engaged with the anchoring projections. This results in the wool remaining in one continuous fleece without either dropping from the sheep in small patches or fall into the belly and becoming matted and mixed with stained wool. After a period of approximately six weeks the entire fleece is loose from the sheep and the coat and the engaged fleece can be removed after undoing the fastening means. In this manner the fleece is removed in one continuous portion without parts of the fleece becoming matted, damaged or lost. The wool fleece is then removed from the coat, either mechanically or manually, from where it can be graded or processed in the normal way. After suitable cleaning of the coat, the coat can be reused to harvest further wool fleeces.

The coat described above is capable of holding the fleece on the sheep so that the fleece does not fall off the sheep whilst the biological agent starts to affect the sheep. The coat prevents cotting, that is matting, which is caused by movement of the fleece relative to the sheep which reduces the quality of the wool. The coat also provides for the animal's needs in terms of comfort, mobility and biological functions whilst maintaining the strength and protection provided by the coat. The coat prevents the wool from being damaged and from being contaminated by other environmental factors such as dust and seeds. The adherence of the coat to the fleece also assists in holding the fleece in place and increasing stability. The fleece does not drop towards the bottom of the coat and the coat does not sag when wet. Furthermore, the coat provides protection from contaminants whilst maintaining breathability and some protection against moisture.

The coat described above has been specifically designed for use with Merino sheep. It is however understood that the coat that is the subject of this invention can be used with other types of sheep and in fact can also be used in the biological harvesting of the fleece of other animals. Appropriate modifications could be made to the weave and structure of the coat material and the design and positioning of the retention means to accommodate the particular characteristics of the fleece in question.

It will be appreciated that features of the above invention may be varied for different applications. The foregoing description of the embodiments of the invention has been presented for the purpose of illustration only. It is not intended to be exhaustive or to limit the invention to the embodiments, and many variations and modifications will be obvious to one skilled in the art.

We claim:

1. A fleece retention coat for harvesting a fleece of an animal which has been shed by the animal after administering a biological agent to the animal, the coat comprising:
   a coat body capable of enclosing a substantial portion of the fleece of the animal, and
   fleece retention means provided on an inner surface of the coat body, the fleece retention means comprising a plurality of anchoring projections which are capable of engaging the hair of the fleece of the animal,
   wherein, in use, the fleece retention means holds the fleece in situ such that the fleece may be removed from the animal in substantially one piece when the coat is removed from the animal and the fleece is then removable from the coat so that the coat may be reused.

2. The fleece retention coat according to claim 1 wherein the fleece retention means is positioned in spaced apart elongate strips on the inner surface of the coat body.

3. The fleece retention coat according to claim 1 wherein the anchoring projections are approximately 3 mm in length, and have a density of between 15 and 25 projections per square centimetre.

4. The fleece retention coat according to claim 3 wherein the heads of the projections are hook, ball or mushroom shaped to ensure that, in use, the fleece is adequately held to the coat whilst allowing the easy removal of the fleece from the coat after harvesting.

5. The fleece retention coat according to claim 1 wherein the coat body has four leg portions arranged, in use, to enclose the upper part of the legs of the animal.

6. The fleece retention coat according to claim 5 wherein portions of the coat body adjacent the neck, legs and crutch areas of the animal are reinforced to prevent excessive stretching.

7. The fleece retention coat according to claim 1 wherein edges of the coat are provided with fastening means that may be secured together to hold the coat in position on the back of the animal.

8. The fleece retention coat according to claim 7 wherein the fastening means comprises any one or more of the following types of fasteners, buckles, straps, ties, buttons, press studs, zips, clasps or hook and eye fastening strips.

9. The fleece retention coat according to claim 1 wherein the coat body is knitted or woven polyester with inherent elasticity to fit animals of varying sizes.

10. The fleece retention coat according to claim 9 wherein the coat body is made from a material which has an open weave sufficiently large to allow the coat to breathe but small enough to prevent escape of the fleece or entry of contaminants.

11. The fleece retention coat according to claim 10 wherein the coat material is polyester gabardine of about 218 gms/$m^2$, woven with a yarn count of about 85×42 ends and picks per square inch and a fabric construction of about warp×weft 300 D×300 D.

12. A method of harvesting fleece of an animal comprising the steps of:

administering a biological depilatory agent to the animal which causes breakage of the hair of the fleece of the animal, fitting a fleece retention coat according to claim 1 to the animal so that the coat holds the hair of the fleece of the animal, removing the coat from the animal after a predetermined period of time so that the fleece is removed substantially in one portion from the animal, and removing the fleece from the coat so that the coat may be reused.

13. The method of claim 12 wherein the animal is a sheep.

14. A method of harvesting fleece of an animal comprising:

administering a biological depilatory agent to the animal, fitting a fleece retention coat to the animal so that the coat holds the hair of the fleece of the animal, fleece retention means being provided on an inner surface of the coat body, and removing the coat from the animal after a predetermined period of time so that the fleece is removed substantially in one portion from the animal.

15. The method of claim 14 wherein the coat encloses a substantial portion of the fleece of the animal.

16. The method of claim 15 wherein the fleece retention means holds the fleece, prior to said removing of the coat, such that the fleece may be removed from the animal in substantially one piece when the coat is removed from the animal.

17. The method of claim 14 further comprising removing the fleece from the coat so that the coat can be reused.

18. The method of claim 14 wherein the animal is a sheep.

* * * * *